(12) United States Patent
AlNasser et al.

(10) Patent No.: US 10,477,362 B1
(45) Date of Patent: Nov. 12, 2019

(54) INTERFACE AND AUTHORIZATION FOR CROSS-NETWORK COMMUNICATIONS

(71) Applicant: Saudi Arabian Oil Company, Dhahran (SA)

(72) Inventors: Hussain A. AlNasser, Dammam (SA); Hanan Naji Al-Ali, Doha (SA); Murtada Abdullah Alqushairi, Qatif (SA); Zahrah Adnan Almousa, Dammam (SA); Mohammad Khaled Almunea, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/198,055

(22) Filed: Nov. 21, 2018

(51) Int. Cl.
*H04W 4/10* (2009.01)
*H04W 88/06* (2009.01)
*H04W 4/08* (2009.01)

(52) U.S. Cl.
CPC .............. *H04W 4/10* (2013.01); *H04W 4/08* (2013.01); *H04W 88/06* (2013.01)

(58) Field of Classification Search
CPC .......... H04W 4/10; H04W 4/08; H04W 88/06
See application file for complete search history.

(56) References Cited

U.S. PATENT DOCUMENTS

| 6,415,158 B1 | 3/2002 | King et al. |
| 8,150,450 B1 | 3/2012 | Wengrovitz |
| 2006/0046697 A1* | 3/2006 | Koren ..................... H04W 4/10 455/412.2 |
| 2016/0135230 A1* | 5/2016 | Swierczynski ......... H04W 4/10 455/518 |
| 2017/0339535 A1* | 11/2017 | Mazzarella ............. H04M 3/56 |

OTHER PUBLICATIONS

Kazakos et al., "A Real-Time IVR Platform for Community Radio," Vulnerable Populations and Technology Support, CHI May 7-12, 2016, 2 pages.

* cited by examiner

*Primary Examiner* — Marisol Figueroa
(74) *Attorney, Agent, or Firm* — Fish & Richardson P.C.

(57) ABSTRACT

Techniques are described for providing cross-network communication between a telephone network and a radio network. For example, implementations can operate to provide two-way communication between a mobile radio device and a telephone, computing device, and/or other suitable device that connects to a telephone network, by creating two-way communications between a mobile radio network and a telephone network. This inter-communication between the two networks enables landline telephones and mobile devices that are connected to a telephone network to communicate with radio devices that are connected to radio network. Implementations provide a portal service and one or more voice radio interfaces (VRIs). The portal service can employ an interactive voice response system as a user interface, enabling a user calling in from a telephone network to provide information that is used to establish communications with radio devices connected to radio network. The VRIs intermediate communications between the networks.

15 Claims, 5 Drawing Sheets

INTERFACE AND AUTHORIZATION FOR CROSS-NETWORK COMMUNICATIONS

BACKGROUND

Different communication networks, devices, and/or protocols may be used in different contexts. For example, radio devices such as portable (for example, hand-carried or vehicle-mounted) or less portable (for example, desktop) radio devices can be used to establish two-way communications between parties over a radio network in instances where wired or wireless telephone networks may be unavailable, unreliable, or costly. Moreover, different communication networks can use separate frequency bands within the radio frequency spectrum. For example, a mobile radio network can operate within a separate frequency band or bands than a cellular telephone network. Radio networks can be accessed using portable radio communication devices and/or less portable types of radio communication devices, which can be made and sold by various manufacturers and vendors.

SUMMARY

Implementations of the present disclosure are generally directed to techniques for providing communication across different communication networks that are communicably independent from one another. More particularly, implementations of the present disclosure are directed to interfaces and authorization mechanisms that enable cross-network communications between a telephone network and a (for example, mobile) radio network.

In general, implementations of innovative aspects of the subject matter described in this specification can be embodied in a method that includes the following operations: receiving at least one signal sent by a first communication device, the at least one signal including a request to communicate through a portal service with at least one second communication device, the request received from the first communication device over a telephone network, the at least one second communication device arranged to communicate over a radio network that is communicably independent from the telephone network; authenticating a user of the first communication device based on at least one credential included in the at least one signal; and in response to authenticating the user, establishing a two-way communication session between the first communication device and the at least one second communication device through a voice radio interface (VRI) that intermediates between the telephone network and the radio network.

These and other implementations can each optionally include one or more of the following innovative aspects: the at least one signal is received from the first communication device through an interactive voice response (IVR) interface provided by the portal service; the at least one second communication device includes a plurality of second communication devices that are included in a radio talk group designated by the portal service; at least one signal indicates a selection of the radio talk group from a plurality of radio talk groups designated by the portal service; authenticating the user further comprises determining that the user is authorized to communicate with the selected radio talk group; the operations further include receiving at least one additional signal from the first communication device during the two-way communication session; the at least one additional signal sent in response a key press on the first communication device to activate a push-to-talk (PTT) feature of the portal service for sending audio data from the first communication device to the at least one second communication device during the two-way communication session; the VRI intermediates by translating, during the two-way communication session, at least one telephone signal from the first communication device to a radio signal that is receivable by the at least one second communication device, at least one radio signal from the at least one second communication device to a telephone signal that is receivable by the first communication device; and/or the telephone network is a Public Switched Telephone Network (PSTN).

Other implementations of any of the aspects include corresponding systems, apparatus, and/or computer programs that are configured to perform the operations of the methods. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description. Other features and advantages of the present disclosure will be apparent from the description and drawings, and from the claims.

DETAILED DESCRIPTION

Implementations of the present disclosure are directed to techniques for managing cross-network communication between a telephone network (for example, mobile) and a radio network. For example, implementations can operate to provide two-way communication between a mobile radio device and a telephone, computing device, and/or other suitable device that connects to a telephone network, by creating two-way communications between a mobile radio network and a telephone network. This inter-communication between the two networks enables landline telephones and mobile devices that are connected to a Public Switched Telephone Network (PSTN), for example, to communicate with radio devices that are connected to mobile radio network. Implementations employ a portal service, executing on portal server(s), and one or more voice radio interfaces (VRIs). In some examples, the portal service can also be described as an interactive voice response (IVR) farm. The portal service can employ an IVR system as a user interface. A user calling in from a telephone network can navigate the IVR to provide information that is used to establish communications with radio devices connected to a mobile radio network. The portal service can also handle security, accounts administration, and/or other aspects. For example, the portal service can authenticate a user to ensure that the user is authorized to use the service to communicate with radio device(s).

In some implementations, the VRI converts radio signals to voice signals, and converts voice signals to radio signals, to enable the two-way communication between devices on the telephone network and the radio network. In some instances, the VRI can convert a received voice signal to a radio signal prior to transmitting the radio signal through radio antennas to devices on the mobile radio network. The VRI can also convert a received radio signal to a telephone signal prior to relaying the telephone signal back to the telephone network (for example, a PSTN) through an internet protocol (IP) network or other suitable network. Through this mechanism, a caller who is using a cellular phone or landline telephone set can listen to and talk with a person, or a group of people, who are using mobile handheld radio sets or desktop radio sets.

Implementations enable users to access the portal service and communicate with (for example, push-to-talk) mobile radio devices from any type of telephone or other device that can communicate over a telephone network, thus providing a cost-effective mechanism for communications between devices on different communications networks (for example, telephone and mobile radio networks) that are communicably independent from one another. Implementations also provide a low-cost scalability solution for mobile radio networks, through integration with existing voice telephony networks instead of expanding mobile radio networks by adding costly infrastructure components such as radio towers.

Figure 1:
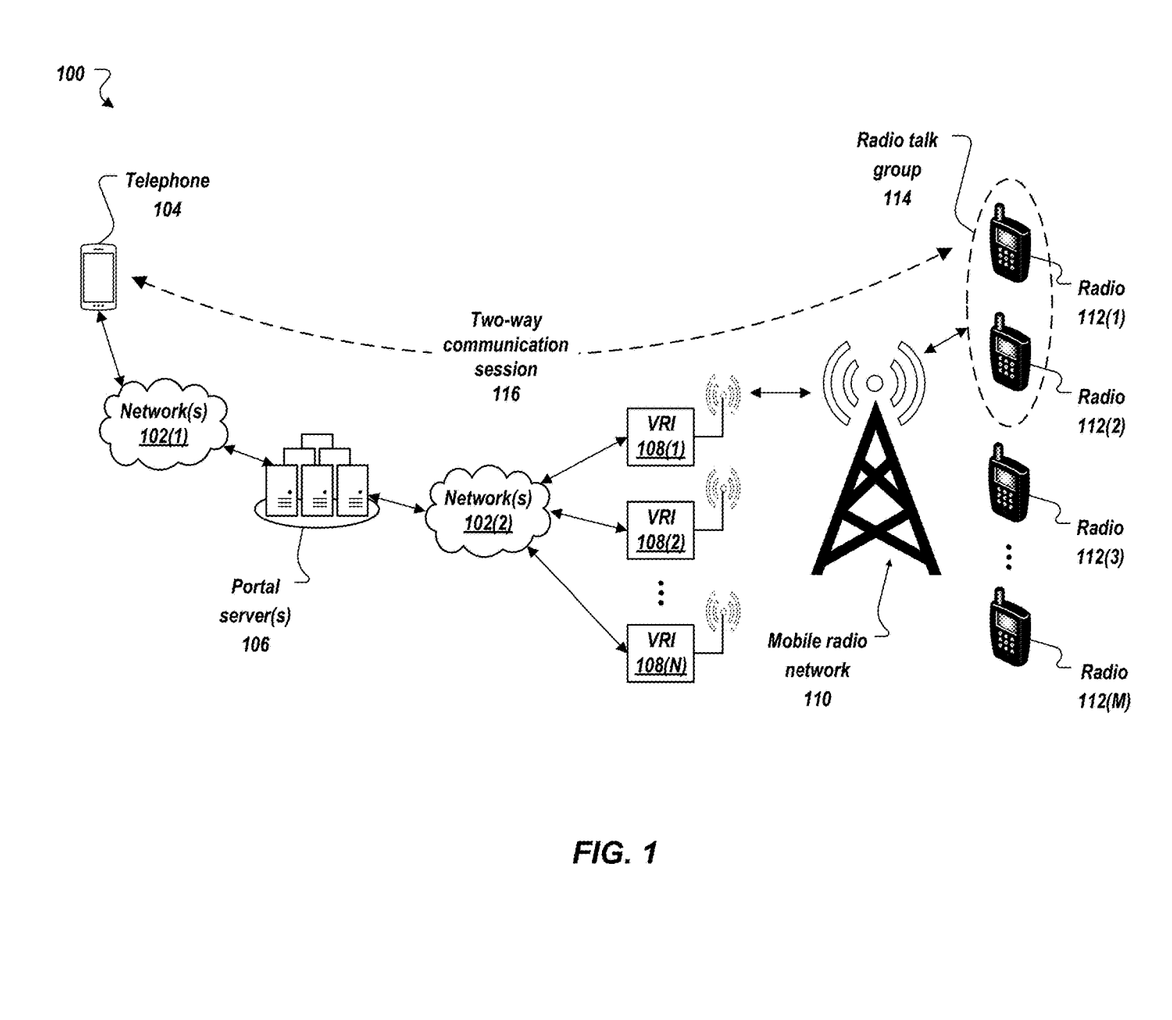
FIG. 1 depicts an example system for managing cross-network communications, according to implementations of the present disclosure.

FIG. 1 depicts an example system for managing cross-network communications, according to implementations of the present disclosure. As shown in the example of FIG. 1, a system 100 can include a communication networks 102(1) and 102(2). In some examples, the network(s) 102(1) include at least one telephone network, such as a PSTN, and the network(s) 102(2) include IP network(s) such as the internet or other suitable wide area network (WAN). In some examples, the network(s) 102(1) also include an IP network. The network(s) 102(1) may enable communication between any number of telephones 104. The telephone(s) 104 can include stationary telephones, portable (for example, mobile) phones such as smartphones, in-vehicle telephone devices, and so forth. The telephone(s) 104 can also include any other suitable devices that are able to communicate over a telephone network, such as computing devices that include software and/or hardware components for voice telephony, video and/or audio conferencing, and so forth. For example, a telephone 104 may be a laptop, desktop, or tablet computer that executes software to enable voice and/or video chat with other computers and/or telephones.

The system 100 can also include a mobile radio network 110 that enables communications between radio device(s) 112, also referred to as radio(s) 112. The radio device(s) 112 can include any suitable type and number of radio devices, including portable (for example, mobile) radio devices (for example, handheld, vehicle-mounted, etc.), as well as less portable types of radio devices such as desktop radio sets or primarily stationary radio communication devices. As used herein, a mobile radio device refers to a radio communication device that is capable of being readily moved or transported, such as a handheld radio set.

A user may employ a telephone 104 to connect, over the network(s) 102(1), with portal server(s) 106. The portable server(s) 106 can include any suitable number and type of computing device, including device(s) that provide distributed computing and/or cloud computing services. The portal server(s) 106 can execute a portal service that enables the user of the telephone 104 to communicate with one or more radio devices 112 using the implementations described herein. The portal service is described in more detail in this disclosure.

The system 110 can also include any suitable number of VRIs 108. Each VRI 108 can intermediate a communication session between a telephone 104 and one or more radio devices 112. The portal service may receive the user's request, submitted to the portal service through the user's telephone 104, to communicate with particular radio device(s) 112 that are identified by the user. In some examples, the user may use the portal service to request communications with a radio talk group 114, which may include any suitable number of radio devices 112. In response to the request, the portal service can determine a particular VRI to establish and manage a communication session 116 for two-way communication between the telephone 104 and the radio talk group 114 of radio device(s) 112.

The mobile radio network 110 can be accessed using handheld radios, desktop radio sets, and/or other types of radio devices 112. These devices may be manufactured by different manufacturers and/or sold by different vendors. Implementations provide a solution to use widely available telephones, such as mobile phones, to access and communicate via mobile radio networks in a secure and interactive manner. In some implementations, the portal service integrates the following components: IVR for interfacing with users; secure active directory (AD) for authentication, authorization, and/or accounting; and digital signal processing (DSP) circuit(s) for voice to radio conversion, as described further.

The mobile radio network 110 may be different than, and communicably independent from, the network(s) 102(1) and/or 102(2), for example, the telephone network(s), that the telephone 104 is configured to communicate over. For example, the network(s) 102(1) and/or 102(2) can be a telephony network that is a PSTN, a cellular telephone network (for example, support 3G, 4G, 5G, and so forth), a network supporting analog telephone service, sometimes described as plain old telephone service (POTS), and so forth. The mobile radio network 110 may be communicably independent from the telephone network in that it operates over different (for example, radio) frequency band(s) and/or using different communication protocols, and such that a device on one network may not be able to communicate directly with a device on the other network without the intermediation provided by the portal service and VRI(s) described herein. Implementations can be employed to provide communications between any suitable radio network and any suitable telephone network.

Figure 2:
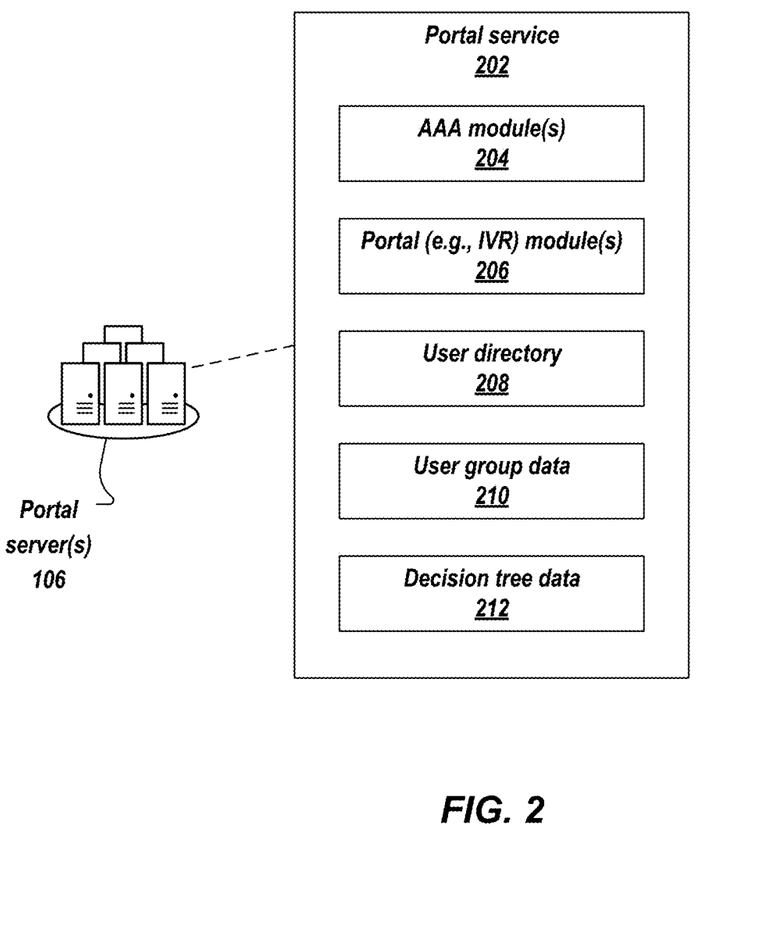
FIG. 2 depicts a an example portal service, according to implementations of the present disclosure.

FIG. 2 depicts an example portal service 202, according to implementations of the present disclosure. The portal service 202 may be executed on (for example, hosted by) the portal server(s) 106. The portal service 202 can include various components implemented as executing software module(s) and/or stored data, including authorization, authentication, accounting (AAA) module(s) 204, portal (for example, IVR) module(s) 206, a user directory 208, user group data 210, and/or decision tree data 212.

The AAA module(s) 204 can perform operations to authenticate a user calling into the portal service 202, based on credentials (for example, passcode, personal identification number (PIN), etc.) provided by the user. The AAA module(s) 204 can compare the credentials to previously established and stored credentials for the user, and verify the identity of the user based on a correspondence between the provided credentials and the previously established (for example, received and stored) credentials for the user. In some implementations, the user may establish credentials and/or other user information with the portal service through an initial registration process to set up a user account, specify preferred radio talk groups, set up payment methods, and so forth. The AAA module(s) 204 can determine whether the user who is calling in is authorized to use the portal service, and/or determine a particular authorized level or degree of access for the particular user. The AAA module(s) 204 can also handle accounting, for example to log access requests, communication sessions, payments, and so forth.

The portal module(s) 206 can provide an interface by which the user interacts with the portal service 202. In some implementations, this interface is an IVR tree that the user can navigate, using their telephone 104, to request access to the various features provided by the portal service. For example, the IVR tree can include a hierarchical menu through which the user first establishes their identity and then specifies a radio talk group (or one or more radio devices) to communicate with.

The user directory 208 can list authorized users of the portal service 202 along with other information regarding each user, such as identification information (for example, name, telephone number, etc.). In some implementations, the user directory 208 is a version of AD provided by Microsoft™, or other suitable directory service. The AAA module(s) 204 can use the information in the user directory 208 to verify the identity and authorization of users calling in to the portal service 202.

The user group data 210 can describe one or more user groups that each includes one or more users and/or their respective communication devices (for example, telephones and/or radio devices). For example, a user group can identify a radio talk group as a collection of radio devices and/or a collection of radio device users. A user group can have a name or other identifier that identifies the group as a whole, and the user calling in can request to establish a communication session with the group to have a multi-party conversation with members of the group.

The decision tree data 212 can describe one or more hierarchical trees of question-and-response nodes that may be presented through the portal module(s) 206, for example, as an IVR tree. For example, a top-level node in the tree may ask the user to provide credential(s) (for example, username, password, PIN, and so forth). If the user is authenticated successfully, the next-level node in the tree may prompt the user with a list of available radio talk groups to choose from, the list including those radio talk groups that the user is authorized to speak with. Following the user's selection of one of the groups (for example, by pressing a key or speaking a number corresponding to the list item for the selected group), the platform may connect the user's call to a particular VRI designated to intermediate communications session(s) with the particular group. After the session is established and the conversation is ongoing, the user may press # to activate a PTT feature, * to select a different radio talk group, or 9 to end the call. Other keys may be used, as appropriate, and implementations are not limited to these particular examples, and spoken numbers or other characters may be accepted in addition to or instead of button presses.

The portal service 202 can receive a call from the user's telephone 104, via the network 102(1) (for example, the PSTN), and perform authentication and authorization checks to verify the user's identity and/or authorization to access the service. In some implementations, the authentication can be performed based on credentials supplied by the user through the IVR interface. For example, one node in the IVR tree may ask the user to enter their PIN through their telephone touch pad. Authentication can also be performed based on identifying the user's telephone number (for example, the number of the telephone the user is using to call into the service), and verifying that the calling in number is the same as the registered number of the user (for example, stored in the user directory). Once the user has been authenticated and determined to be authorized, the portal service 202 can prompt the user to specify a radio talk group they wish to speak with. For example, the IVR tree may prompt the user to select from a list of available radio talk groups. In some examples, the service can confirm that the user is authorized to speak with the specified radio talk group, and access privileges for the user may limit their access such that they may be allowed to communicate with particular radio talk group(s).

In response to authenticating the user and confirming that they are authorized to speak with the requested radio talk group, the portal service 202 can connect the call to a designated VRI 108, which establishes and manages the call between the telephone 104 and the radio talk group 114. In some implementations, the VRI 108 may be selected based on the requested radio talk group 114, and the VRI 108 can be dedicated to intermediate communications with that particular radio talk group 114. After the communication session has been established between the telephone 104 and the radio talk group 114, the user may press # (or some other designated key) on their phone to activate a push-to-talk (PTT) feature, simulating the PTT feature of a (for example, mobile) radio device. The session may continue for any appropriate period of time until the user terminates the session, for example, through an option in the IVR interface or by hanging up their phone or otherwise terminating the call.

Figure 3:
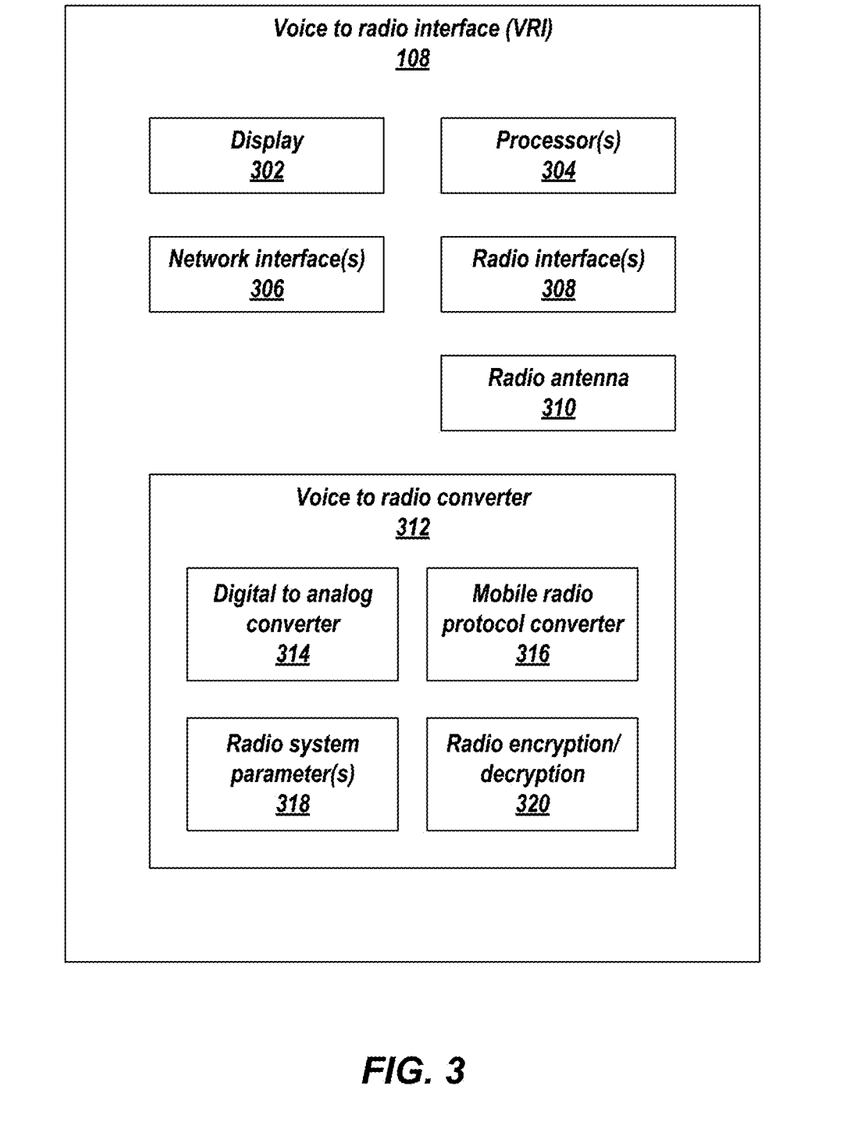
FIG. 3 depicts an example voice to radio interface, according to implementations of the present disclosure.

FIG. 3 depicts an example schematic of the VRI 108, according to implementations of the present disclosure. The VRI 108 can be described as a transceiver that facilitates the communication between an IP network 102(2) and a mobile radio network 110.

As shown in this example, the VRI 108 can include a display 302 for presenting information, such as information describing the connection(s) between telephone 104 and radio devices 112 that are being, or have been, managed by the VRI 108. The display 302 can also present information about the VRI 108 such as health and status of the VRI, its assigned IP address, and so forth. The display 302 can be any suitable type of display.

The VRI 108 can also include one or more processors 304 of any suitable type. For example, the processors 304 can include a central processing unit (CPU) that performs the logic, arithmetic, and intelligence of the VRI 108, as well as controlling the input/output of the VRI 108.

The VRI 108 can also include one or more network interfaces 306 that enable the VRI 108 to communicate with other devices (for example, the portal servers, telephones) over the network(s) 102(2). The network interface(s) 306 can manage the transmitting and receiving of digital traffic from and to the IP network 102(2).

The VRI 108 can include one or more radio interfaces 308 and a radio antenna 310 that enable the VRI 108 to communicate with radio devices 112 over the mobile radio network 110. The radio interface 308 and radio antenna 310 transmit and receive the analog signals to and from the mobile radio network.

The VRI 108 can also include a voice to radio converter 312 that converts telephone signals to radio signals, and that converts radio signals to telephone signals, to intermediate communications between the two different networks. The converter 312 can include a digital to analog converter 314, a mobile radio protocol converter 316, radio system parameter(s) 318, and radio encryption and decryption module(s) 320. The voice to radio converter 312 can perform operations for signal processing, including converting digital signals to analog and vice versa, encrypting and decrypting the data in the signals, adapting the signals to conform to a mobile radio protocol during conversion of the signals, adding radio system parameters as appropriate, and so forth.

Figure 4:
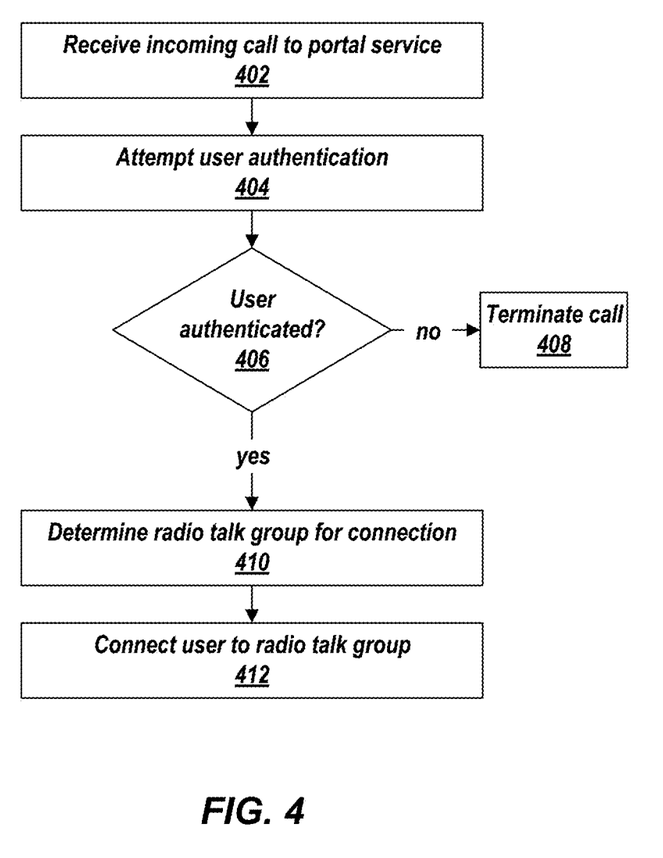
FIG. 4 depicts a flow diagram of an example process for managing cross-network communications, according to implementations of the present disclosure.

FIG. 4 depicts a flow diagram of an example process for managing cross-network communications, according to implementations of the present disclosure. The operations of the process can be performed by the portal service 202, the VRI 108, and/or other software and/or hardware components of the system.

An incoming call can be received (402) at the portal service 202, from a telephone 104 connecting over a telephone network such as a PSTN. User authentication can be attempted 404, for example, based on the provided credential(s) of the user, the user's telephone number, and/or other information. If the user is not authenticated (406) after one or more (for example, three) attempts, the call may be terminated (408). If the user is authenticated (406), the service can determine (410) a radio talk group 114 to connect the user with. In some instances, the radio talk group 114 is selected by the user through the IVR tree. The call can then be forwarded to an appropriate VRI, and the user can be connected (412) via the VRI to the radio talk group 114. In some implementations, as described herein, the portal service may confirm that the user is authorized to talk with the requested radio talk group prior to establishing the connection.

The process can enable a user who is using a telephone 104 (for example, landline telephone set, cellular phone, etc.) to communicate with a person or a group of people who are using radio devices (for example, mobile handheld radio sets, desktop radio sets, etc.). In some examples, the process may begin when the user dials a mobile radio IVR number using their telephone 104. The IVR then prompts the caller to input their username, password, and/or other credential(s) for authentication. The caller is authenticated based on their credential(s) and/or other information in the user directory 208 (for example, Active Directory) located in the portal service 202 (for example, IVR farm). If the caller fails to login during a predetermined number of attempts (for example, three attempts), the call may be terminated. If the caller is authenticated, the IVR can prompt the caller with a list of available radio talk groups based on the caller's authorization profile. Following this, the caller may either press a particular key (for example, 9) to end the call or select one of his authorized radio talk groups. If a group is selected, the service can connect the caller to a particular VRI through the IP network 102(2). The caller may then begin listening to the selected radio talk group. To participate in (for example, speak to) the talk group, the caller may press a particular key (for example, #) on their telephone. In this way, implementations can provide PTT functionality that is similar to that available on mobile radio handsets. The caller may also press a particular key (for example, *) to select another radio talk group or press a key (for example, 9) to end the call.

Traditionally, access to mobile radio networks and PTT support has been limited to vendor-provided mobile radio sets. The lack of radio coverage in certain operation areas makes it difficult to use vendor sets due to its dependency on radio frequency (RF) coverage, which may be unavailable in certain environments. Implementations provide an alternative and cost-effective method to access and use a PTT mobile radio system, in instances where there is a telephone set or a cellphone available. A safe and secure connection between telephones and mobile radio devices can be established using the implementations described herein. The portal service allows authorized users to securely access the system and communicate with users of mobile radio devices or other radio devices. Moreover, implementations serve users at a very wide range beyond that traditionally available through a mobile radio network, and can be applicable and accessible at various locations where radio signals may be weak, such as large factories, basements, or other RF-opaque environments.

Implementations provide for a conversion between telephone signals and radio signals using a VRI that provides a digital to analog converter and a mobile radio protocol converter. Each converter can provide a duplex function. The digital to analog converter may include various algorithms to clean the analog signals received from the radio antenna, digitize their content with minimum data content, and encode the signals to ensure successful transport through the IP network in a manner that is both robust and secure. The mobile radio protocol converter can include support for the suitable standards (for example, Terrestrial Trunked Radio (TETRA) standards) to strip the audio signal from the received radio signal, encrypt and decrypt radio signals, and interface with a private or public mobile radio network.

Implementations may provide, in the conversion, one or both of the following. First, implementations may provide for delay tolerance to compensate for the IP network delays due to the stochastic routing behavior and due to transmission media such as fiber and satellite. For example, a satellite network may consume more than 600 ms for packets' round trip journey, and this delay may not be tolerated by the standard mobile radio network. Second, implementations may provide for order correction and/or error correction to ensure the digitized audio signal is reconstructed in the same order as the analog audio signal, and to make ensure the integrity of the conversion. Because the two-way radio setup works with short audio calls with short pauses in between and from different users in the same channel, the order-correction and error correction is key for ensuring a comprehensible conversation. Otherwise, the logic may be lost.

Figure 5:
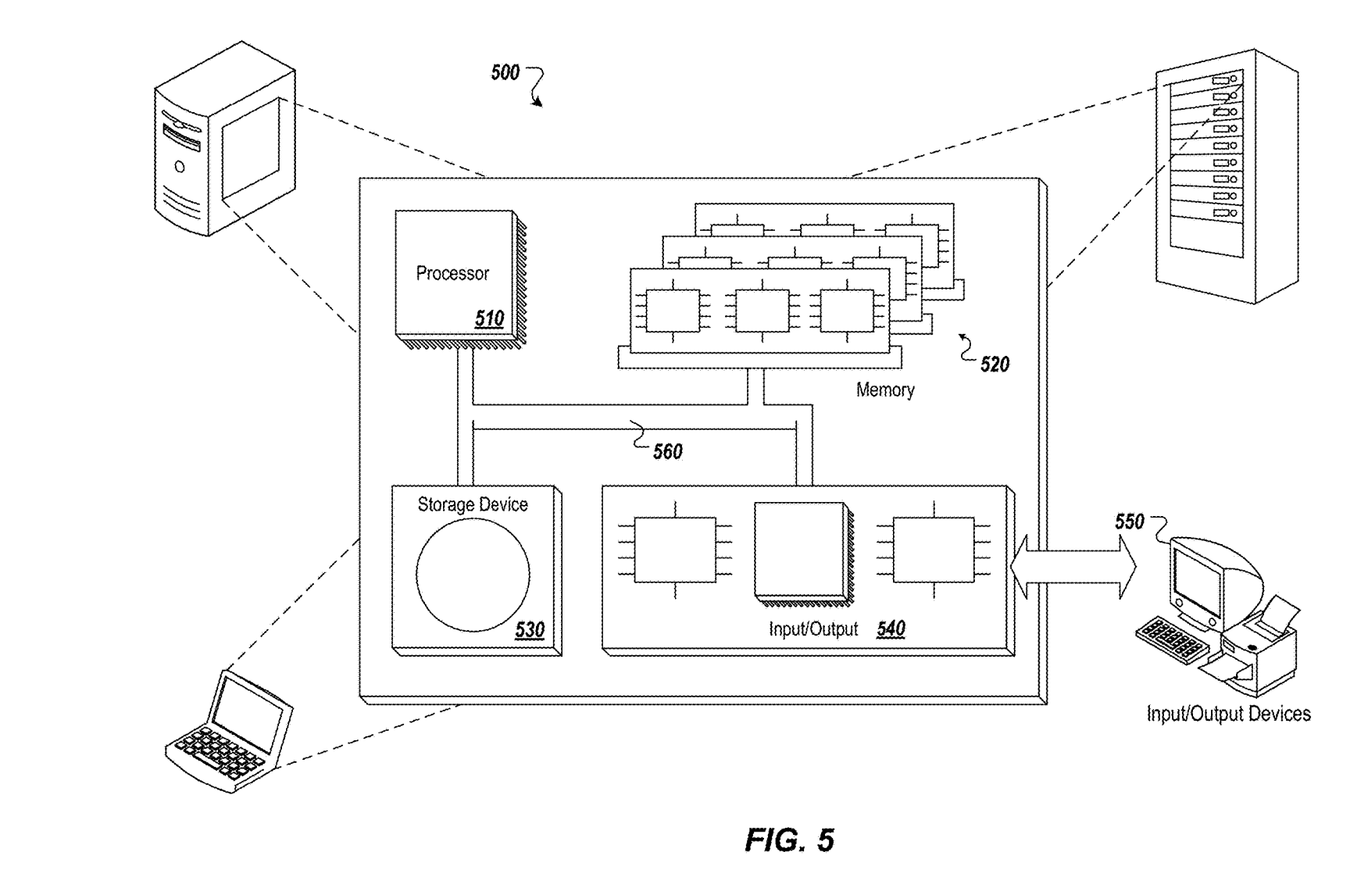
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the portal server(s) 106, the VRI(s) 108, the telephone(s) 104, the radio(s) 112, and/or other computing device(s) or system(s) described herein. The system 500 may include one or more processors 510, a memory 520, one or more storage devices 530, and one or more input/output (I/O) devices 550 controllable via one or more I/O interfaces 540. The various components 510, 520, 530, 540, or 550 may be interconnected via at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. For example, the processor(s) 510 may execute instructions for the various software module(s) described herein. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (for example, persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (for example, a microphone), a gestural input device, a haptic input device, an image or video capture device (for example, a camera), or other devices. In some examples, the I/O device(s) 550 may also include one or more output devices such as a display, LED(s), an audio output device (for example, a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more communication networks using any network protocol.

Computing devices of the system 500 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (for example, 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (for example, a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, in other words, one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, for example, code that constitutes processor firmware, a protocol stack, a database management system, an operating system, or a combination of one or more of them. A propagated signal is an artificially generated signal, for example, a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (for example, one or more scripts stored in a markup language document), in a single file dedicated to the program in question, or in multiple coordinated files (for example, files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, for example, magnetic, magneto optical disks, or optical disks. However, a computer need not have such devices. Moreover, a computer may be embedded in another device, for example, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, for example, a CRT (cathode ray tube) or LCD (liquid crystal display) monitor, for displaying information to the user and a keyboard and a pointing device, for example, a mouse or a trackball, by which the user may provide input to the computer. Other kinds of devices may be used to provide for interaction with a user as well; for example, feedback provided to the user may be any appropriate form of sensory feedback, for example, visual feedback, auditory feedback, or tactile feedback; and input from the user may be received in any appropriate form, including acoustic, speech, or tactile input.

Implementations may be realized in a computing system that includes a back end component, for example, as a data server, or that includes a middleware component, for example, an application server, or that includes a front end component, for example, a client computer having a graphical user interface or a web browser through which a user may interact with an implementation, or any appropriate combination of one or more such back end, middleware, or front end components. The components of the system may be interconnected by any appropriate form or medium of digital data communication, for example, a communication network. Examples of communication networks include a local area network ("LAN") and a wide area network ("WAN"), for example, the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described herein as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described herein should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown herein may be used, with steps re-ordered, added, or removed. Accordingly, other implementations are within the scope of the following claims.

The invention claimed is:

1. A computer-implemented method performed by an interactive voice response (IVR) farm, the method comprising:
   receiving at least one signal sent by a first communication device, the at least one signal including a request to communicate through the IVR farm with a radio talk group comprising at least one second communication device, the request received from the first communication device over a Public Switched Telephone Network (PSTN), the at least one second communication device arranged to communicate over a radio network that is communicably independent from the PSTN;
   authenticating a user of the first communication device based on at least one credential included in the at least one signal;
   selecting, based on the radio talk group, one of a plurality of voice radio interfaces (VRIs) communicatively coupled to the IVR farm through an IP network, wherein the selected VRI is designated to intermediate communications sessions with the radio talk group; and
   establishing a two-way communication session between the first communication device and the at least one second communication device through the selected VRI, wherein the VRI intermediates between the PSTN and the radio network to establish the two-way communication session.

2. The method of claim 1, wherein the at least one signal is received from the first communication device through an interactive voice response (IVR) interface provided by the IVR farm.

3. The method of claim 1, wherein at least one signal indicates a selection of the radio talk group from a plurality of radio talk groups designated by the IVR farm.

4. The method of claim 3, wherein authenticating the user further comprises determining that the user is authorized to communicate with the selected radio talk group.

5. The method of claim 1, further comprising:
   receiving at least one additional signal from the first communication device during the two-way communication session,
   wherein the at least one additional signal is sent in response to a key press on the first communication device, wherein the key press activates a push-to-talk (PTT) feature for sending audio data from the first communication device to the at least one second communication device during the two-way communication session.

6. The method of claim 1, wherein the VRI intermediates by translating, during the two-way communication session:
   at least one telephone signal from the first communication device to a radio signal that is receivable by the at least one second communication device; and
   at least one radio signal from the at least one second communication device to a telephone signal that is receivable by the first communication device.

7. A system comprising:
   at least one processor; and
   a memory communicatively coupled to the at least one processor, the memory storing instructions which, when executed, cause the at least one processor to perform operations comprising:
   receiving at least one signal sent by a first communication device, the at least one signal including a request to communicate through an interactive voice response (IVR) farm with a radio talk group comprising at least one second communication device, the request received from the first communication device over a Public Switched Telephone Network (PSTN), the at least one second communication device arranged to communicate over a radio network that is communicably independent from the PTSN;
   authenticating a user of the first communication device based on at least one credential included in the at least one signal;
   selecting, based on the radio talk group, one of a plurality of voice radio interfaces (VRIs) communicatively coupled to the IVR farm through an IP network, wherein the selected VRI is designated to intermediate communications sessions with the radio talk group; and
   establishing a two-way communication session between the first communication device and the at least one second communication device through the selected VRI, wherein the selected VRI intermediates between the PSTN and the radio network to establish the two-way communication session.

8. The system of claim 7, wherein the at least one signal is received from the first communication device through an interactive voice response (IVR) interface provided by the IVR farm.

9. The system of claim 7, wherein at least one signal indicates a selection of the radio talk group from a plurality of radio talk groups designated by the IVR farm.

10. The system of claim 9, wherein authenticating the user further comprises determining that the user is authorized to communicate with the selected radio talk group.

11. The system of claim 7, the operations further comprising:
    receiving at least one additional signal from the first communication device during the two-way communication session, wherein the at least one additional signal is sent in response to a key press on the first communication device, wherein the key press activates a push-to-talk (PTT) feature for sending audio data from the first communication device to the at least one second communication device during the two-way communication session.

12. The system of claim 7, wherein the VRI intermediates by translating, during the two-way communication session:
   at least one telephone signal from the first communication device to a radio signal that is receivable by the at least one second communication device; and
   at least one radio signal from the at least one second communication device to a telephone signal that is receivable by the first communication device.

13. A non-transitory computer-readable medium storing one or more instructions executable by a computer system to perform operations for imaging and locating near-surface heterogeneities, comprising:
   receiving at least one signal sent by a first communication device, the at least one signal including a request to communicate through an interactive voice response (IVR) farm with a radio talk group comprising at least one second communication device, the request received from the first communication device over a Public Switched Telephone Network (PSTN), the at least one second communication device arranged to communicate over a radio network that is communicably independent from the PTSN;
   authenticating a user of the first communication device based on at least one credential included in the at least one signal;
   selecting, based on the radio talk group, one of a plurality of voice radio interfaces (VRIs) communicatively coupled to the IVR farm through an IP network, wherein the selected VRI is designated to intermediate communications sessions with the radio talk group; and
   establishing a two-way communication session between the first communication device and the at least one second communication device through the selected VRI, wherein the selected VRI intermediates between the PSTN and the radio network to establish the two-way communication session.

14. The non-transitory computer-readable medium of claim 13, wherein the at least one signal is received from the first communication device through an interactive voice response (IVR) interface provided by the IVR farm.

15. The non-transitory computer-readable medium of claim 13, wherein:
   at least one signal indicates a selection of the radio talk group from a plurality of radio talk groups designated by a portal service; and
   authenticating the user further comprises determining that the user is authorized to communicate with the selected radio talk group.

* * * * *

UNITED STATES PATENT AND TRADEMARK OFFICE
CERTIFICATE OF CORRECTION

PATENT NO. : 10,477,362 B1
APPLICATION NO. : 16/198055
DATED : November 12, 2019
INVENTOR(S) : Hussain A. AlNasser et al.

Page 1 of 1

It is certified that error appears in the above-identified patent and that said Letters Patent is hereby corrected as shown below:

On the Title Page

Column 2 (Other Publications), Line 2, delete "Technology" and insert -- Technological --;

Column 2 (Other Publications), Line 3, delete "2 pages." and insert -- 12 pages. --;

In the Claims

Column 14, Line 38, Claim 7, delete "PTSN;" and insert -- PSTN; --;

Column 15, Line 29, Claim 13, delete "PTSN;" and insert -- PSTN; --.

Signed and Sealed this
Twenty-sixth Day of May, 2020

Andrei Iancu
*Director of the United States Patent and Trademark Office*